(12) United States Patent
Ohtaki (10) Patent No.: US 10,814,786 B2
(45) Date of Patent: Oct. 27, 2020

(54) SHOOTING SYSTEM FOR MOBILE OBJECT (71) Applicant: HONDA MOTOR CO., LTD., Tokyo (JP)

(72) Inventor: Shintaro Ohtaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/689,464

(22) Filed: Nov. 20, 2019

(65) Prior Publication Data

US 2020/0198540 A1 Jun. 25, 2020

(30) Foreign Application Priority Data

Dec. 20, 2018 (JP) .................... 2018-238606

(51) Int. Cl.
*B60R 1/00* (2006.01)
*H04N 5/247* (2006.01)
*B60J 1/00* (2006.01)
*G05D 1/02* (2020.01)
*G07C 5/08* (2006.01)

(52) U.S. Cl.
CPC .............. *B60R 1/001* (2013.01); *B60J 1/002* (2013.01); *G05D 1/0246* (2013.01); *G07C 5/0808* (2013.01); *H04N 5/247* (2013.01); *B60R 2300/105* (2013.01); *B60R 2300/20* (2013.01); *B60R 2300/50* (2013.01); *B60R 2300/80* (2013.01)

(58) Field of Classification Search
None
See application file for complete search history.

(56) References Cited

U.S. PATENT DOCUMENTS

| 7,731,373 | B2 * | 6/2010 | Oskarsson | B60S 1/026 359/512 |
|---|---|---|---|---|
| 10,351,073 | B2 | 7/2019 | Usami et al. | |
| 2006/0086000 | A1 * | 4/2006 | Lee | D06F 58/30 34/524 |
| 2008/0258010 | A1 * | 10/2008 | Leon | B64D 15/12 244/134 F |
| 2011/0233248 | A1 * | 9/2011 | Flemming | B60R 11/02 224/482 |

(Continued)

FOREIGN PATENT DOCUMENTS

JP 2017-206098 A 11/2017

*Primary Examiner* — Jayanti K Patel
*Assistant Examiner* — Stefan Gadomski
(74) *Attorney, Agent, or Firm* — Thomas Horstemeyer, LLP (57) ABSTRACT

There is provided with a shooting system for a mobile object. A first shooting unit shoots surroundings of a mobile object via a first transmissive portion. A second shooting unit shoots surroundings of the mobile object via a second transmissive portion. A first heater is capable of heating the first transmissive portion. A second heater is capable of heating the second transmissive portion. A notification unit notifies a passenger of information. A control unit determines a malfunction of the first heater and the second heater, and causes the notification unit to give notification regarding an occurrence of the malfunction. The control unit suppresses the notification by the notification unit when it is determined that the second heater has malfunctioned compared to when it is determined that the first heater has malfunctioned.

7 Claims, 7 Drawing Sheets (56) References Cited

U.S. PATENT DOCUMENTS

| | | | |
|---|---|---|---|
| 2012/0193341 A1* | 8/2012 | Reul | B32B 17/10036 |
| | | | 219/203 |
| 2012/0234816 A1* | 9/2012 | Petrenko | H05B 1/0236 |
| | | | 219/203 |
| 2015/0034621 A1* | 2/2015 | Timmermann | B60R 11/04 |
| | | | 219/203 |
| 2016/0091714 A1* | 3/2016 | Hui | B60R 1/002 |
| | | | 359/512 |
| 2016/0375828 A1* | 12/2016 | Yun | B60S 1/0848 |
| | | | 701/48 |
| 2017/0334364 A1 | 11/2017 | Usami et al. | |
| 2017/0334366 A1* | 11/2017 | Sliwa | B60R 11/04 |
| 2019/0193647 A1* | 6/2019 | Oikawa | H05B 3/84 |
| 2019/0193683 A1* | 6/2019 | Oikawa | H05B 1/0236 |
| 2019/0193684 A1* | 6/2019 | Oikawa | B60S 1/026 |
| 2019/0200416 A1* | 6/2019 | Shinkai | G03B 17/55 |
| 2019/0208822 A1* | 7/2019 | Mullin | H05B 1/0244 |
| 2019/0297675 A1* | 9/2019 | Vadgaonkar | G01P 21/025 |
| 2019/0369683 A1* | 12/2019 | Vishnubhatla | G06F 1/3206 |

* cited by examiner

SHOOTING SYSTEM FOR MOBILE OBJECT

CROSS-REFERENCE TO RELATED APPLICATION(S)

This application claims priority to and the benefit of Japanese Patent Application No. 2018-238606 filed on Dec. 20, 2018, the entire disclosure of which is incorporated herein by reference.

BACKGROUND OF THE INVENTION

Field of the Invention

The present invention relates to a shooting system for a mobile object.

Description of the Related Art

A technique has been suggested that mounts, on a vehicle equipped with a camera that shoots the surroundings of the vehicle, a heater for removing or preventing the fog on window glass within the camera's field of view (Japanese Patent Laid-Open No. 2017-206098).

When a mobile object, such as a vehicle, is equipped with a camera that shoots the surroundings of the mobile object, images shot by the camera may be used in travel assistance for a driver. However, if a malfunction occurs in a heater, there is a possibility that the fog occurs on window glass within the camera's field of view, and images shot by the camera become unclear and unusable in travel assistance. Therefore, when the heater has become unusable due to a malfunction and the like, it may be necessary to notify a passenger to that effect.

Meanwhile, there is a case where a vehicle that provides travel assistance to a driver is equipped with a plurality of cameras. When heaters are provided respectively in correspondence with the plurality of cameras, even if one heater malfunctions and images shot by the corresponding camera become unusable in travel assistance, travel assistance may be able to be continued using images shot by another camera. If a passenger is notified of a malfunction of a heater every time the heater malfunctions, even under a circumstance where travel assistance can be provided regardless of the malfunction of the heater, the passenger may feel annoyed.

SUMMARY OF THE INVENTION

The present invention provides further reduction of the annoyance experienced by a passenger.

According to one embodiment of the present invention, a shooting system for a mobile object, the shooting system comprising: a first shooting unit configured to shoot surroundings of a mobile object via a first transmissive portion that composes a window portion of the mobile object; a second shooting unit configured to shoot surroundings of the mobile object via a second transmissive portion that composes the window portion of the mobile object; a first heater configured to be capable of heating the first transmissive portion; a second heater configured to be capable of heating the second transmissive portion; a notification unit configured to notify a passenger of information; and a control unit configured to determine a malfunction of the first heater and the second heater, and cause the notification unit to give notification regarding an occurrence of the malfunction, wherein the control unit suppresses the notification by the notification unit when it is determined that the second heater has malfunctioned compared to when it is determined that the first heater has malfunctioned.

Further features of the present invention will become apparent from the following description of exemplary embodiments (with reference to the attached drawings).

DESCRIPTION OF THE EMBODIMENTS

<Configuration of Vehicle>

Figure 1A:
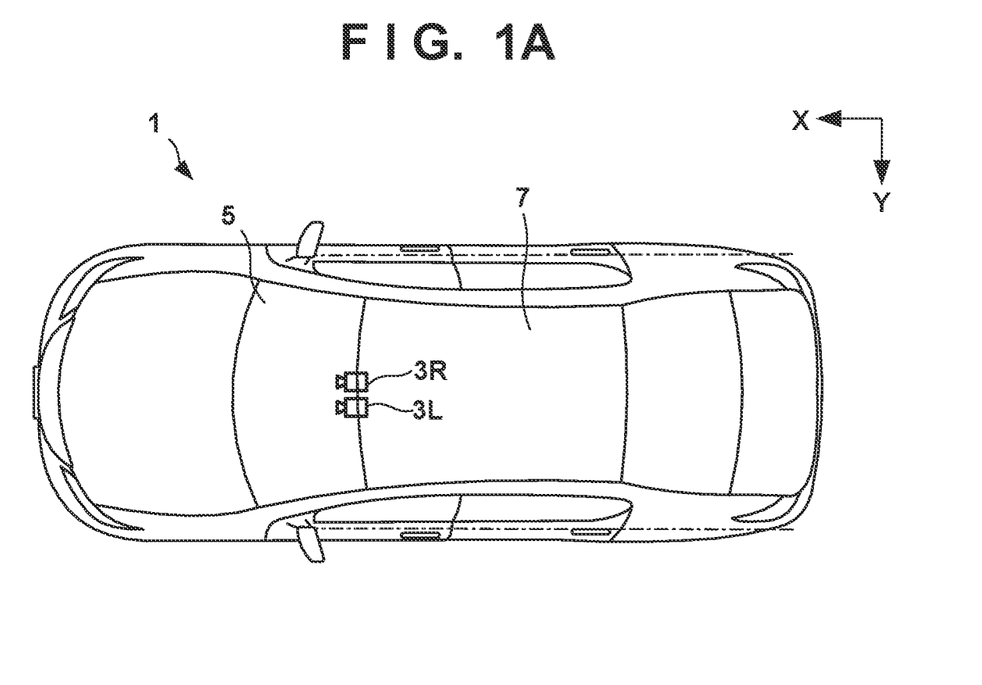
FIGS. 1A and 1B are a plan view and a side view of a vehicle equipped with a vehicular shooting system according to one embodiment of the present invention.
Figure 1B:
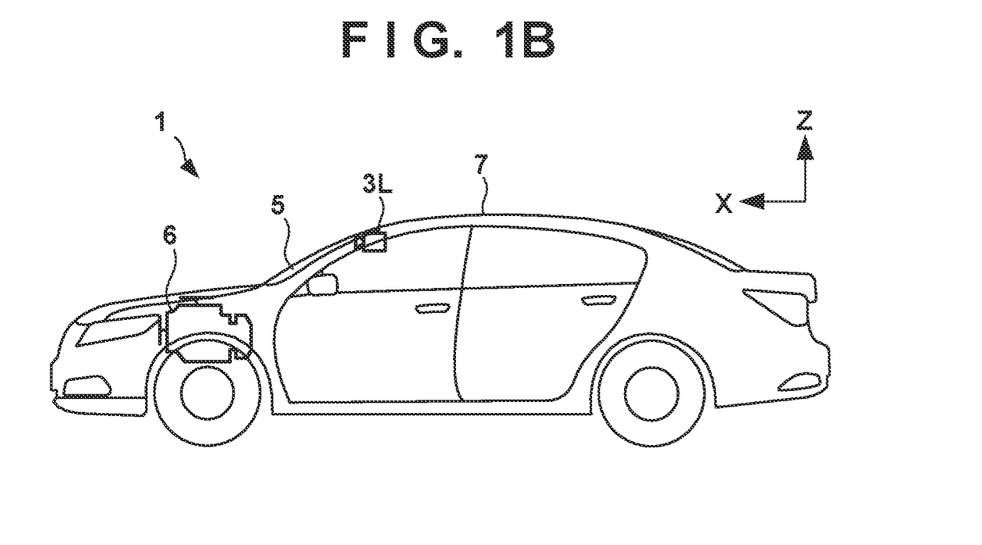

FIGS. 1A and 1B are a plan view and a side view of a vehicle 1 according to an embodiment. Note that in each diagram, an arrow X indicates a front-and-rear direction of the vehicle 1, and an arrow Y indicates a vehicle width direction of the vehicle 1. An arrow Z indicates an up-and-down direction.

As one example, the vehicle 1 is a four-wheeled passenger car of a sedan type. The vehicle 1 has two seats in a front row that is adjacent to a windshield 5, and two seats in a rear row; in the front row, the seat on the right is a driver's seat, and the seat on the left is a passenger seat. The vehicle 1 has a total of four doors that are respectively adjacent to the seats. A driving unit 6 is provided in a front portion of the vehicle 1. The driving unit 6 includes a driving source that exerts a propelling force of the vehicle 1. In the case of the present embodiment, the driving source is an engine (internal combustion engine). The driving unit 6 includes an automatic transmission in addition to the engine. Note that another driving source, such as an electric motor, may be adopted as the driving source, and the driving source may be composed of a combination of a plurality of apparatuses, such as a combination of an internal combustion engine and an electric motor. Furthermore, although a four-wheeled vehicle is exemplarily explained in the present description, the present description is also applicable to other mobile objects, such as a two-wheeled automobile and a watercraft.

The vehicle 1 has shooting apparatuses 3R, 3L that shoot the surroundings of the vehicle 1. In the present embodiment, the shooting apparatuses 3R, 3L shoot images of the front of the vehicle 1. Note that the configuration of the shooting apparatuses 3R, 3L will be described in <Vehicular Shooting System>.

Figure 2:
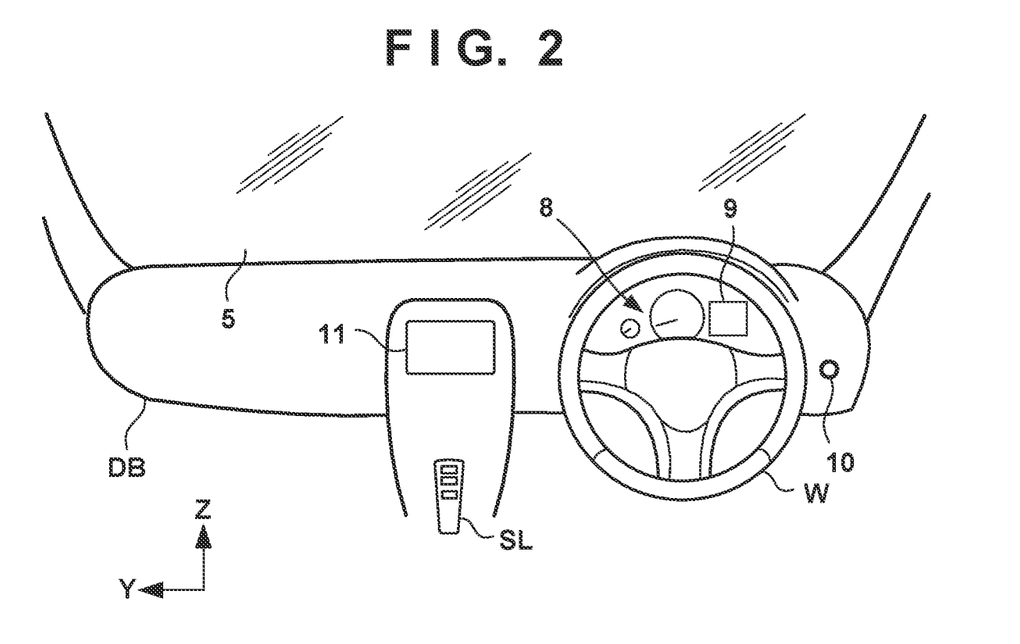
FIG. 2 is a diagram schematically showing an interior of the vehicle according to one embodiment.

FIG. 2 is a diagram schematically showing an interior of the vehicle 1, and especially is a diagram showing the surroundings of a dashboard DB. A steering wheel W is provided in front of the driver's seat, and an instrument panel 8 is mounted on the dashboard DB anterior to the steering wheel W. An ignition switch 10 is mounted on a right edge portion of the dashboard DB. A driver can issue an instruction for activating the engine of the driving unit 6 by operating the ignition switch 10. A display apparatus 11 that displays map information and the like is mounted on a central portion of the dashboard DB in the vehicle width direction, and a shift lever SL is arranged nearby for accepting a shift operation on the automatic transmission.

The instrument panel 8 includes a notification apparatus 9. The notification apparatus 9 is an apparatus that notifies a passenger of various types of information, and is an image display apparatus in the case of the present embodiment. The notification apparatus 9 may be a sound output apparatus, or may be a combination of the image display apparatus and the sound output apparatus. In the case of the present embodiment, when a malfunction has occurred in a later-described heater, the notification apparatus 9 notifies the passenger to that effect if necessary. Although the notification apparatus 9 is included in the instrument panel in the present embodiment, the display apparatus 11 may double as the notification apparatus 9.

<Vehicular Shooting System>

Figure 3:
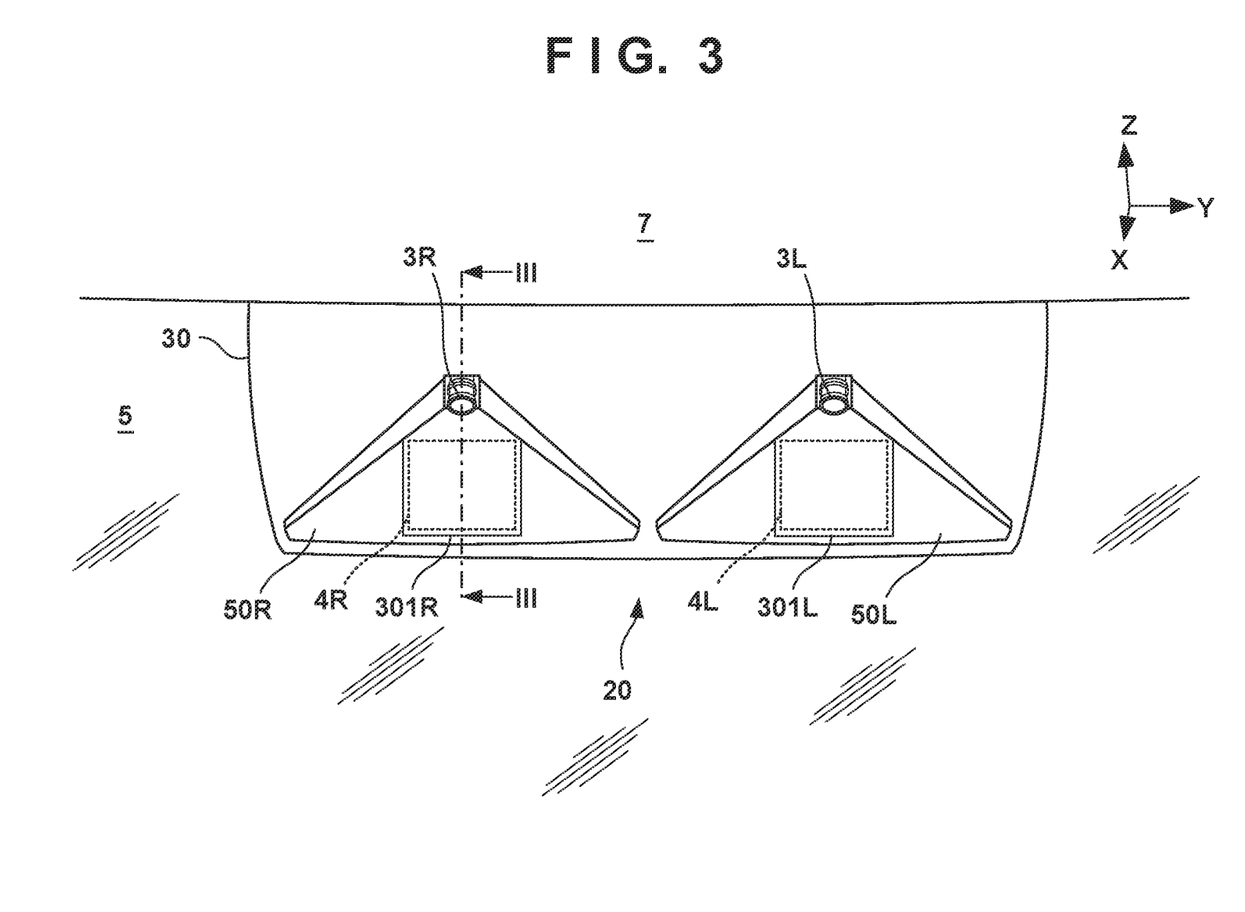
FIG. 3 is a diagram of shooting apparatuses and heaters according to one embodiment, as viewed from the outer side of a windshield.
Figure 4:
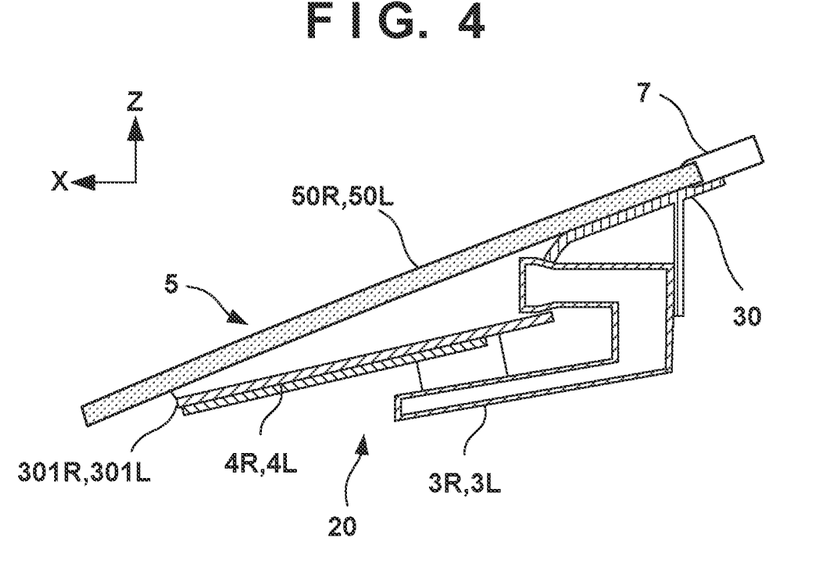
FIG. 4 is a cross-sectional diagram taken along a line III-III of FIG. 3.

Reference is made to FIGS. 3 and 4. FIG. 3 is a diagram of the shooting apparatuses 3R, 3L and the heaters 4R, 4L as viewed from the outer side of the windshield 5. Also, FIG. 4 is a cross-sectional diagram taken along a line of FIG. 3. Although FIG. 4 is a diagram showing the cross-sections of the shooting apparatus 3R and the heater 4R, the shooting apparatus 3L and the heater 4L are configured similarly in the present embodiment, and reference signs of corresponding constituents are given in parentheses in the diagram.

In the present embodiment, a vehicular shooting system 20 includes the shooting apparatuses 3R, 3L and the heaters 4R, 4L. The shooting apparatuses 3R, 3L are, for example, cameras that include an imaging element, such as an image sensor, and an optical system, such as a lens. In the case of the present embodiment, images shot by the shooting apparatuses 3R, 3L are used in, for example, detection of an obstacle in front of the vehicle 1, recognition of road partition lines (e.g., white lines), and so forth. Furthermore, in the case of the present embodiment, the shooting apparatuses 3R, 3L are placed anterior to a roof 7 via a bracket 30 inside a cabin of the vehicle 1, and can shoot the front of the vehicle 1 via transmissive portions 50R, 50L that compose the windshield 5. When viewed from the direction of FIG. 3, lens portions of the shooting apparatuses 3R, 3L are exposed, and main body portions of the same are hidden behind or below the bracket 30 and the heaters 4R, 4L (FIG. 4). Note that the shooting apparatus 3R and the shooting apparatus 3L may have similar external and internal configurations, or may have different configurations depending on the usage mode.

The heaters 4R, 4L that can respectively heat the transmissive portions 50R, 50L are provided below the transmissive portions 50R, 50L. In the present embodiment, the heaters 4R, 4L are affixed to the back side of SLSs (stray light prevention structures) 301R, 301L. The SLSs 301R, 301L are plate-like members for suppressing diffuse reflection of light that has been transmitted through the transmissive portions 50R, 50L and incident on the inside of the cabin. The SLSs 301R, 301L are disposed so that their front side faces the transmissive portions 50R, 50L, and the heaters 4R, 4L are affixed to their back side. That is to say, in the present embodiment, the heaters 4R, 4L are mounted on the bracket 30 via the SLSs 301R, 301L.

The heaters 4R, 4L are provided in order to remove or prevent the fog on the transmissive portions 50R, 50L. For example, when heating is used inside the cabin under a low ambient temperature, the temperature difference between the inside and outside of the cabin may increase, and the fog may occur on window glass and the like of the vehicle due to condensation. Furthermore, for example, under a low ambient temperature, the fog may occur on window glass and the like also due to ice and frost attached to an outer surface of the vehicle. If the fog occurs on the transmissive portions 50R, 50L, images shot by the shooting apparatuses 3R, 3L may become unclear, and the shot images may not be usable in detection of an obstacle, partition lines, and the like in travel assistance. In view of this, in the present embodiment, the fog on the transmissive portions 50R, 50L is removed or prevented by providing the heaters 4R, 4L respectively for the shooting apparatuses 3R, 3L.

The heaters 4R, 4L are, for example, electrothermal heaters. In the case of the present embodiment, the heaters 4R, 4L have a plate-like shape, and the surroundings of the same can be heated by current flowing through electrothermal wires arranged in plate-like portions. Note that the configuration of the heaters 4R, 4L are exemplary, and other configurations can be adopted. For example, electrothermal wires may be provided around the transmissive portions 50L, 50R of the windshield 5 itself. Note that the heater 4R and the heater 4L may have similar external and internal configurations, or may have different configurations depending on the usage mode.

In the present embodiment, the bracket 30, which supports the shooting apparatuses 3R, 3L and the heaters 4R, 4L, is mounted on the roof 7. However, a configuration in which the bracket 30 adheres to the windshield 5 is also possible. Furthermore, although the shooting apparatuses 3R, 3L and the heaters 4R, 4L are all attached to a single bracket 30 in the present embodiment, it is also possible to adopt a configuration in which the shooting apparatus 3R and the heater 4R are attached to the same bracket and the shooting apparatus 3L and the heater 4L are attached to another same bracket.

Although the transmissive portions 50R, 50L are both provided on the windshield 5 in the present embodiment, it is also possible to adopt a configuration in which the two transmissive portions are provided on a rear window. Furthermore, the two transmissive portions may be provided on separate windows, such as the windshield 5 and the rear window. That is to say, the shooting ranges of the two shooting apparatuses may overlap, or may be different from each other.

Figure 5:
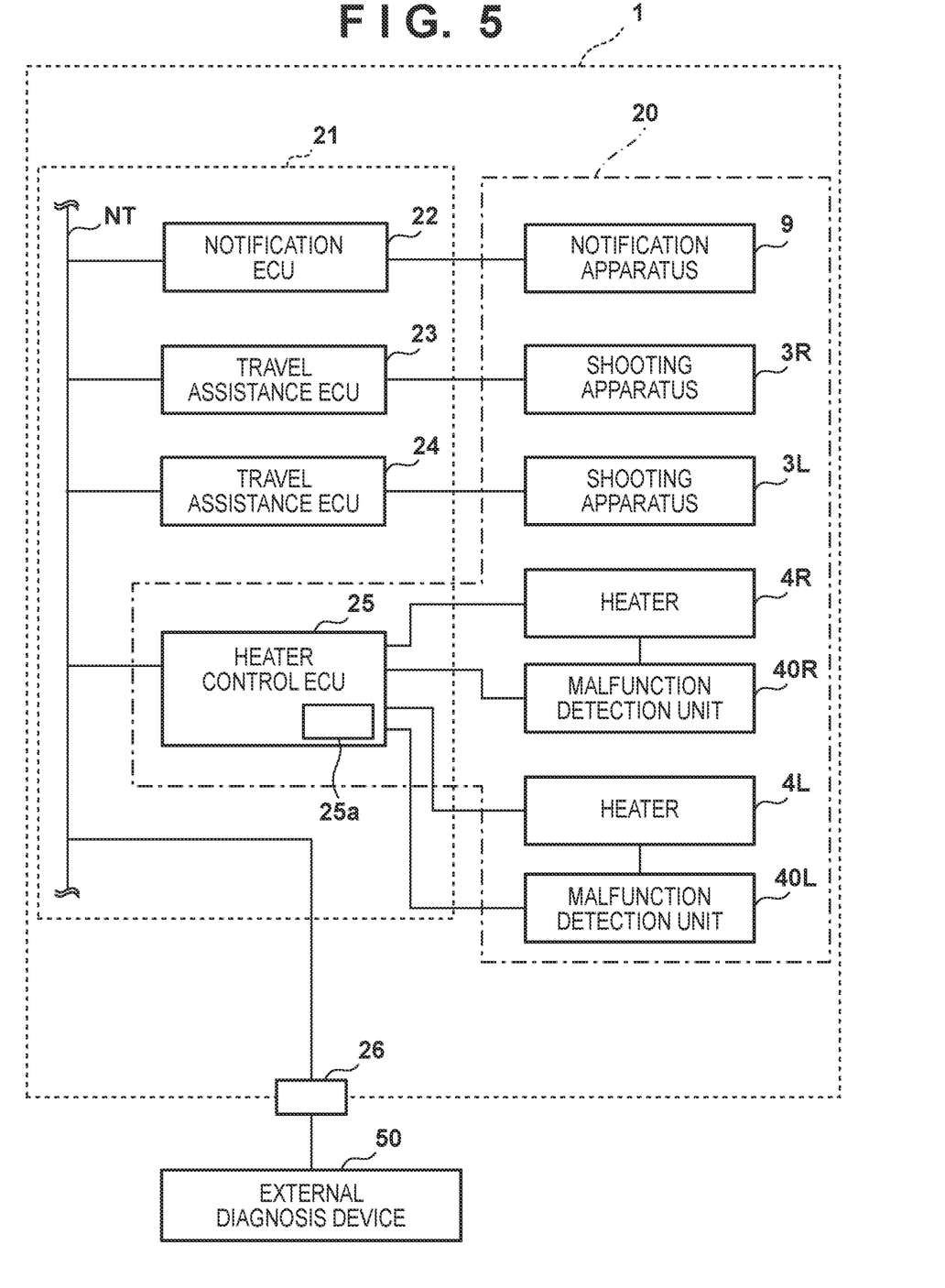
FIG. 5 is a block diagram showing an exemplary configuration of a control system of the vehicle according to one embodiment.

FIG. 5 is a block diagram showing an exemplary configuration of a control system of the vehicle 1, and is a schematic diagram in which a part of constituents pertaining to control of the vehicle 1 is omitted. FIG. 5 depicts constituents that are necessary in relation to later-described features of the present embodiment, including constituents of the vehicular shooting system 20 among constituents pertaining to control of the vehicle 1.

A control unit 21 includes a plurality of ECUs (Electronic Control Units) 22 to 25. The respective ECUs are connected via an in-car network NT in such a manner that they can communicate with one another. Each ECU includes a processor that is typically a CPU, a storage device, such as a semiconductor memory, an interface with an external device, and the like. The storage device stores programs executed by the processor, data that is used by the processor for processing, and the like. Each ECU may include a plurality of processors, storage devices, interfaces, and the like. Note that the number of ECUs and the functions assigned to them can be designed as appropriate, and finer segmentation than the present embodiment, or integration, is possible.

The ECU 22 controls the notification apparatus 9. The ECUs 23 and 24 provide travel assistance (in other words, driving assistance) as control of travelling of the vehicle 1 based on the shooting apparatuses 3R, 3L and the result of detection by other non-illustrated detection units. The ECU 25 controls determination of a malfunction of the heaters 4R, 4L, and the operations of the same. Note that in FIG. 5, the names of representative functions of the ECUs 22 to 25 are appended. For example, the ECU 22 is written as "notification ECU". In the present embodiment, the vehicular shooting system 20 includes the ECU 25 (an ECU for heater control). In accordance with a later-described flowchart, the ECU 25 instructs the notification apparatus 9 to give notification in the event of a malfunction of the heaters 4R, 4L.

In the present embodiment, images shot by the shooting apparatuses 3R, 3L are used in controls by separate ECUs 23, 24, and the ECUs 23, 24 respectively execute travel assistance controls that provide different degrees of assistance.

In the present embodiment, the ECU 23 executes at least control related to automated driving (AD) of the vehicle 1. That is to say, the shooting apparatus 3R is used at least in control related to automated driving (AD). For example, the ECU 23 executes control based on images shot by the shooting apparatus 3R and the result of detection by a non-illustrated detection unit (e.g., Light Detection and Ranging (LIDAR) that detects an object around the vehicle 1 using light). In the present embodiment, the ECU 23, for example, detects an obstacle around, and executes control of lane keeping, lane changing, automated braking, and the like based on the result of the detection. At this time, with regard to at least one of steering, braking, and driving of the vehicle 1, the ECU 23 outputs a control command to one or more ECUs (not illustrated) that control them. As a result, the ECU 23 automatically controls the vehicle 1 with regard to at least one of steering, braking, and driving of the vehicle 1, irrespective of the driving operations performed by the driver.

On the other hand, in the present embodiment, the ECU 24 executes at least control related to an Advanced Driving Assistant System (ADAS). That is to say, the shooting apparatus 3L is used at least in control in the Advanced Driving Assistant System. For example, the ECU 24 executes control based on images shot by the shooting apparatus 3L and the result of detection by a non-illustrated detection unit (e.g., a millimeter-wave radar that detects an object around the vehicle 1 using radio waves). In the present embodiment, the ECU 24, for example, detects partition lines (white lines) for vehicles and detects a vehicle ahead, and executes control of lane departure suppression, automated braking, and the like based on the results of the detections. As a result, the ECU 24 can provide travel assistance to the driver during manual driving as appropriate.

As described above, the shooting apparatus 3R is used at least in control related to automated driving (AD); thus, the shooting apparatus 3R is used in control that provides a high degree of assistance in travel assistance compared to the shooting apparatus 3L that is used at least in control related to the Advanced Driving Assistant System (ADAS). Note that hereinafter, the shooting apparatus 3R and the heater 4R may be referred to as the shooting apparatus 3R and the heater 4R on the AD side, and the shooting apparatus 3L and the heater 4L may be referred to as the shooting apparatus 3L and the heater 4L on the ADAS side.

Note that the ECU 24 may execute control as necessary also during automated driving. For example, the ECU 24 may execute control of automated braking and the like at the same time as the above-described execution of control of lane keeping and lance changing by the ECU 23. That is to say, during automated driving, while control functions are executed mainly by the ECU 23, the ECU 24 can supplementarily execute the control functions. Similarly, the ECU 23 may execute control as necessary during manual driving.

Furthermore, both of the ECU 23 and the ECU 24 may execute the same control. For example, safety can be further improved by having each of the ECU 23 and the ECU 24 perform control related to safety functions, such as automated braking control, as in the present embodiment. Note that the control functions executed by the ECUs 23, 24 are examples, and the control functions to be executed and the assigning of the same can be changed as appropriate.

The ECU 25 controls the heaters 4R, 4L. For example, the ECU 25 executes control related to the operations of the heaters 4R, 4L, such as adjustment of output of the heaters 4R, 4L and switching between ON and OFF of the same. The ECU 25 can also determine a malfunction of the heaters 4R, 4L, and instruct the ECU 22 to give notification using the notification apparatus 9.

In the present embodiment, the vehicular shooting system 20 further includes malfunction detection units 40R, 40L. The ECU 25 determines a malfunction of the heaters 4R, 4L based on the result of detection by the malfunction detection units 40R, 40L. For example, the malfunction detection units 40R, 40L are temperature sensors. The ECU 25 may periodically obtain the temperatures of the heaters 4R, 4L detected by the temperature sensors, and determine that a malfunction has occurred in the heaters 4R, 4L when these temperatures are not within a predetermined range. Furthermore, for example, current sensors may be used as the malfunction detection units 40R, 40L, and a temperature fuse may be provided in an electrical circuit that includes the heaters (electrothermal wires). With the provision of the temperature fuse, the temperature fuse is cut and current no longer flows through the heaters 4R, 4L when the heaters 4R, 4L have become too high in temperature due to a malfunction; thus, the heaters 4R, 4L can be prevented from having excessively high temperatures. In this case, the ECU 25 may obtain the result of detection by the current sensors for the heaters 4R, 4L, and determine that a malfunction has occurred in the heaters 4R, 4L when it is determined that the temperature fuse has been cut from the result of the detection. Although the ECU 25 controls the operations of the heaters 4R, 4L and determines a malfunction of the same in the present embodiment, it is also possible to adopt a configuration in which the ECU 25 only controls the operations and another ECU determines a malfunction and instructs the ECU 22 to give notification. In addition, for example, the ECU 22 may determine a malfunction by directly obtaining the result of detection by the malfunction detection units 40R, 40L, and cause the notification apparatus 9 to give notification in accordance with the result of the determination.

Moreover, in the present embodiment, the vehicular shooting system 20 further includes a malfunction information storage unit 25a that stores malfunction information of the heaters 4R, 4L. The malfunction information storage unit 25a is, for example, a storage device, such as a nonvolatile memory, provided in the ECU 25. When the processor of the ECU 25 has determined that a malfunction has occurred in the heaters 4R, 4L, the ECU 25 stores its malfunction information into the malfunction information storage unit 25a. The malfunction information stored in the malfunction information storage unit 25a can be read out by, for example, connecting an external diagnosis device 50 to a data link connector 26 provided inside the cabin. The external diagnosis device 50 can diagnose a malfunction of the control system of the vehicle 1, and can detect malfunction information of the vehicle 1 from the ECU 25, another ECU, and the like. As will be described later, according to the present embodiment, in the event of a malfunction of the heaters 4R, 4L, a passenger may not be notified to that effect, but the malfunction of the heaters 4R, 4L can be detected at a later time by storing malfunction information into the malfunction information storage unit 25a. Note that the malfunction information storage unit 25a is not limited to a storage device inside the ECU 25, and may be provided separately from the ECU 25.

<Exemplary Processing of Control Unit>

Figure 6:
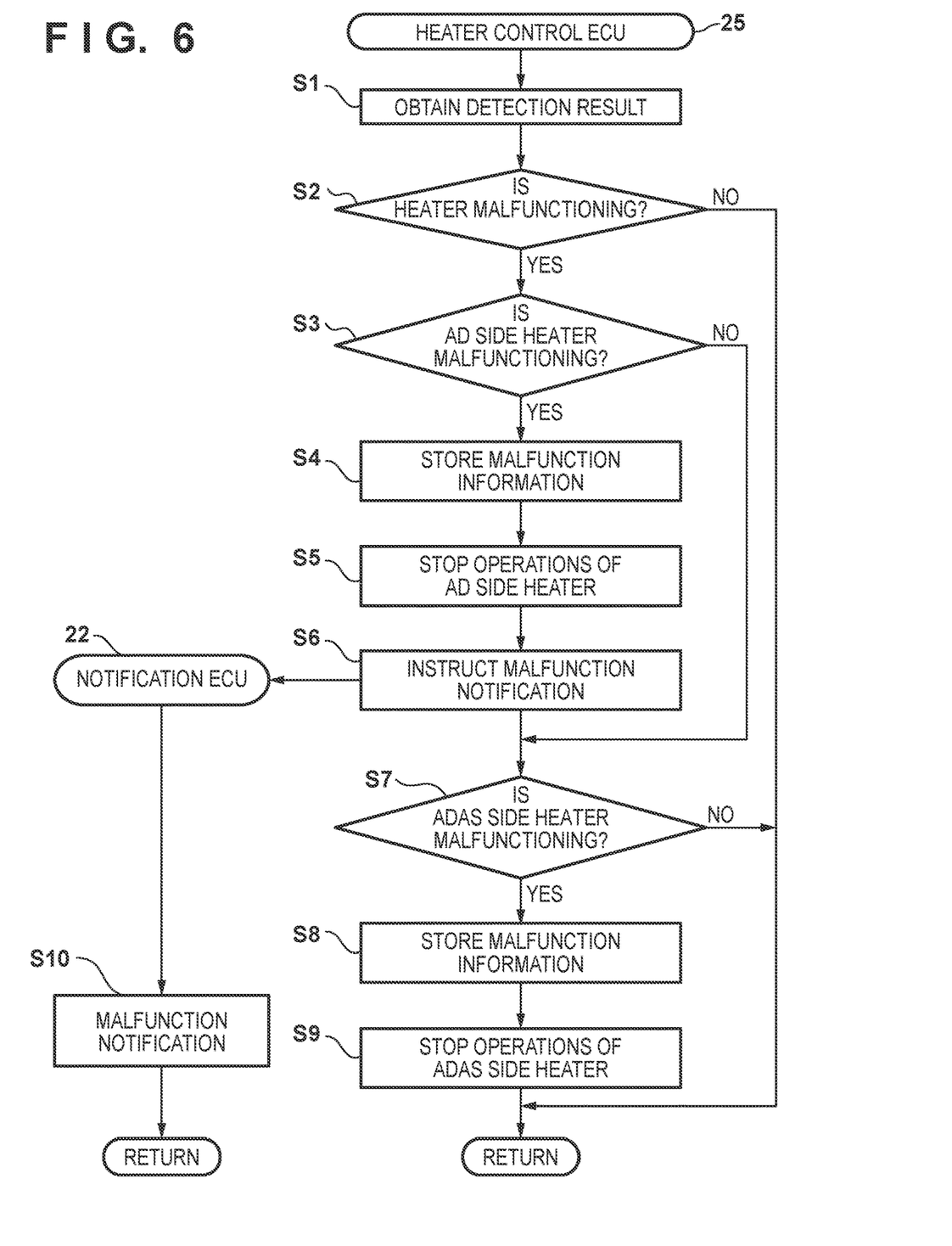
FIG. 6 is a flowchart showing exemplary processing for a case where a malfunction has occurred in a heater according to one embodiment.

Exemplary processing of the control unit 21 will now be described. FIG. 6 is a flowchart showing an example of processing that is executed by the ECU 25 (heater control ECU) and the ECU 22 (notification ECU) in the event of a malfunction of the heaters 4R, 4L.

Even when a malfunction has occurred in one of the heaters 4R, 4L during the execution of travel assistance control, the ECUs 23, 24 can continue the travel assistance control as long as the fog has not occurred on the transmissive portions 50R, 50L, because the malfunction has not occurred in the shooting apparatuses themselves. Furthermore, even under a circumstance where the fog has occurred on one of the transmissive portions 50R, 50L, the travel assistance control may be able to be continued as long as one of them is usable. For example, in the present embodiment, at the time of the execution of automated driving, control is executed mainly by the ECU 23, which uses images shot by the shooting apparatus 3R in control. Therefore, automated driving control can be continued even when a malfunction of the heater 4L has caused the fog on the transmissive portion 50L and rendered images shot by the shooting apparatus 3L, which are used by the ECU 24 in control, unclear. Therefore, if a passenger is notified of a malfunction of the heaters 4R, 4L every time the malfunction has occurred, a situation arises in which the notification is given even though the travel assistance control is executable, and the passenger may feel annoyed.

In view of this, in the present embodiment, the passenger is notified when a malfunction has occurred in the heater 4R on the AD side, and the notification to the passenger is suppressed when a malfunction has occurred in the heater 4L on the ADAS side; in this way, the annoyance felt by the user can be reduced. Furthermore, even when a malfunction of the heater 4L on the ADAS side has caused the fog on the transmissive portion 50L, automated driving can be continued because the automated driving control is executed mainly by the ECU 23, which performs control using images shot by the shooting apparatus 3R.

Referring to FIG. 6, in step S1, the ECU 25 obtains the result of detection by the malfunction detection units 40R, 40L. Next, in step S2, the ECU 25 determines whether a malfunction has occurred in the heaters 4R, 4L. The ECU 25 proceeds to step S3 if it is determined that the malfunction has occurred, and ends single processing if it is determined that the malfunction has not occurred.

In step S3, whether a malfunction has occurred in the heater 4R, which is provided with respect to the shooting apparatus 3R for AD, is determined. The ECU 25 proceeds to step S4 if it is determined that the malfunction has occurred, and proceeds to step S7 if it is determined that the malfunction has not occurred.

In step S4, the ECU 25 stores, into its malfunction information storage unit 25a, information indicating that the malfunction has occurred in the heater 4R on the AD side. Subsequently, in step S5, the ECU 25 stops the operations of the heater 4R on the AD side. Furthermore, in step S6, the ECU 25 instructs the ECU 22 (notification ECU) to notify a passenger of the malfunction of the heater 4R.

In step S7, whether a malfunction has occurred in the heater 4L, which is provided with respect to the shooting apparatus 3L on the ADAS side, is determined. The ECU 25 proceeds to step S8 if it is determined that the malfunction has occurred, and ends single processing if it is determined that the malfunction has not occurred. In step S8, the ECU 25 stores, into its malfunction information storage unit 25a, information indicating that the malfunction has occurred in the heater 4L on the ADAS side. Subsequently, in step S9, the ECU 25 stops the operations of the heater 4L on the ADAS side. Thereafter, the ECU 25 ends single processing.

Meanwhile, when instructed by the ECU 25 to give notification regarding the malfunction of the heater 4R on the AD side in step S6, the ECU 22 causes the notification apparatus 9 to give notification in step S10. For example, the notification apparatus 9 displays, on its display unit, a message indicating that the malfunction has occurred in the heater 4R. Also, for example, the notification apparatus 9 may issue an audio message indicating that the malfunction has occurred in the heater 4R, or may be, for example, a combination of these. The content of the message may be an instruction for switching from a state where travel assistance control is in execution to manual driving, or may suggest a visit to a dealer for repair. After notifying the passenger, the ECU 22 ends single processing.

According to the above-described processing, the ECU 25 suppresses notification by the notification apparatus 9 when it is determined that a malfunction has occurred in the heater 4L compared to when it is determined that a malfunction has occurred in the heater 4R. In this way, the frequency of notification to the passenger in the event of a heater malfunction is lowered, and thus the annoyance felt by the passenger can be further reduced. Furthermore, in the present embodiment, the ECU 25 does not notify the passenger when it is determined that a malfunction has occurred in the heater 4L. In this way, the annoyance felt by the user can be further reduced. Moreover, the shooting apparatus 3R is used in control that provides a high degree of assistance compared to the shooting apparatus 3L. Therefore, when a malfunction has occurred in the heater 4L, although the passenger is not notified, control related to travel assistance executed by the ECU 23 can be continued because the heater 4R corresponding to the shooting apparatus 3R can operate.

Other Embodiments

Figure 7:
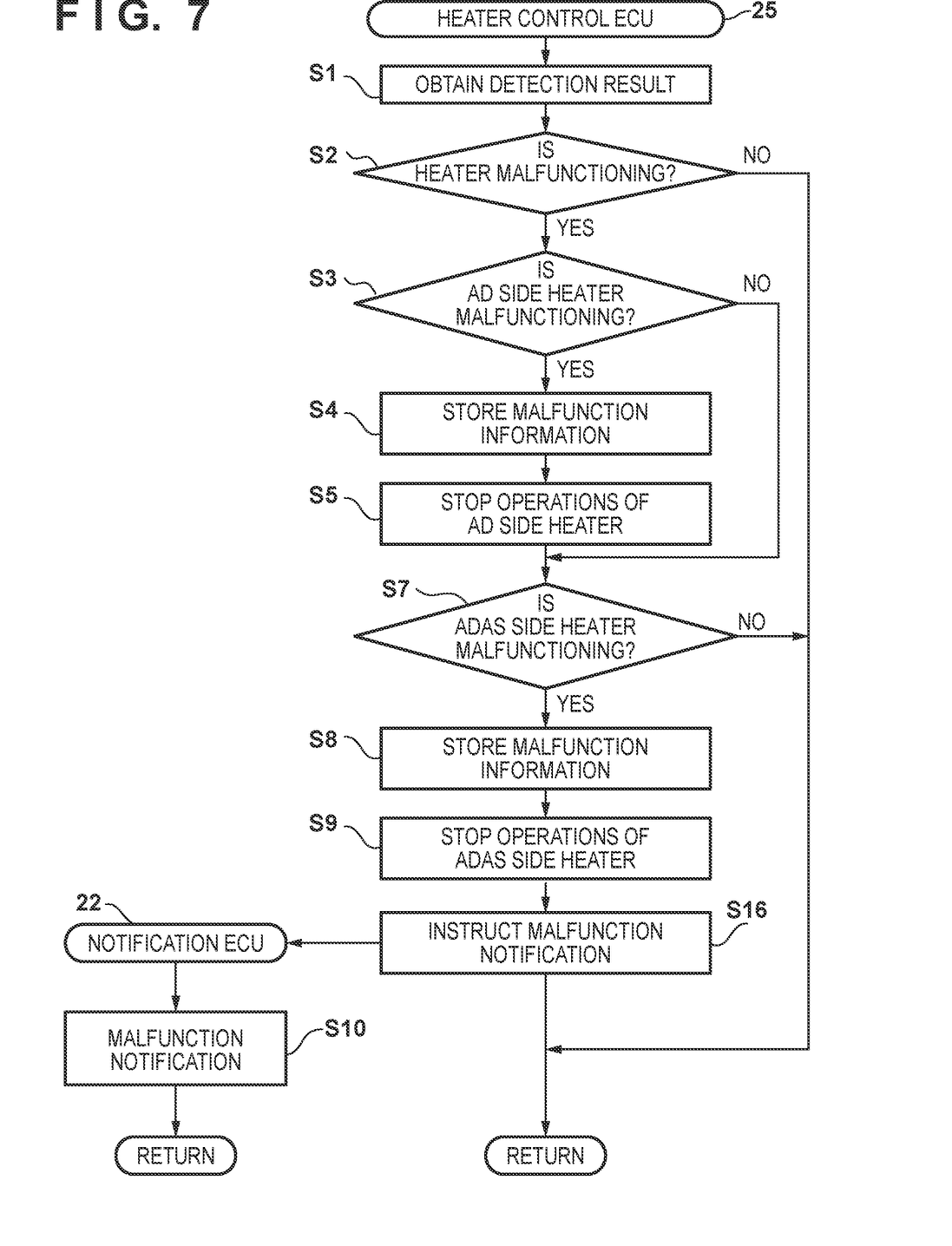
FIG. 7 is a flowchart showing exemplary processing for a case where a malfunction has occurred in a heater according to another embodiment.

Although a passenger is notified in the event of a malfunction of the heater 4R on the AD side in the above-described embodiment, the passenger may be notified in the event of a malfunction of the heater 4L on the ADAS side. FIG. 7 is a flowchart showing an example of processing that is executed by the ECU 25 (heater control ECU) and the ECU 22 (notification ECU) in the event of a malfunction of the heaters 4R, 4L according to another embodiment. Note that processes that are similar to those of FIG. 6 are given the same reference signs thereas, and a description thereof is omitted.

In the present embodiment, if it is determined that a malfunction has occurred in the heater 4R on the AD side in step S3, the ECU 25 stops the operations of the heater 4R in step S5, and then proceeds to step S7 without instructing the ECU 22 to give notification regarding the malfunction. That is to say, the passenger is not notified. On the other hand, if it is determined that a malfunction has occurred in the heater 4L on the ADAS side in step S7, the ECU 25 stops the operations of the heater 4L in step S9, and then instructs the ECU 22 to give notification regarding the malfunction in step S16. When instructed, the ECU 22 causes the notification apparatus 9 to notify the passenger in step S10. With the foregoing configuration, the passenger is notified only when a malfunction has occurred in the heater 4L on the ADAS side.

In the present embodiment, the ECU 24 executes control related to safety functions, such as automated braking and white line detection. Therefore, as a result of notifying the user only when a malfunction has occurred in the heater 4L corresponding to the shooting apparatus 3L, which is used in control of the ECU 24, it is possible to both ensure the range of use of safety functions and reduce the annoyance felt by the user.

Furthermore, a configuration is possible in which malfunction information that has been stored into the malfunction information storage unit 25a in the above-described embodiment is transmitted to an external server and the like via a communication apparatus (not illustrated) that is provided in the vehicle 1 and can perform wireless communication. In this way, a dealer and the like can be aware of the malfunction information even when the passenger is not notified of and does not acknowledge a heater malfunction.

Furthermore, in the above-described embodiment, the passenger is notified when a malfunction has occurred in one heater, and the passenger is not notified when a malfunction has occurred in another heater; in this way, notification regarding another heater is suppressed. However, as a configuration that suppresses notification regarding another heater, it is also possible to adopt, for example, a configuration that delays a timing of notification.

As one example, while the passenger may be notified immediately in accordance with the flow of FIG. 6 when a malfunction of the heater 4R has been detected, the passenger may be notified at a timing of turning OFF the ignition switch 10 upon completion of driving, or at a timing of starting driving next time, when a malfunction of the heater 4L has been detected. The annoyance felt by the user can be reduced also through the above-described suppression of notification regarding another heater by delaying a timing of notification regarding another heater relative to a timing of notification regarding a malfunction of one heater.

Summary of Embodiment

The above-described embodiment discloses at least the following shooting system for a mobile object.

1. A shooting system for a mobile object according to the above-described embodiment includes: a first shooting unit (e.g., 3R) configured to shoot surroundings of a mobile object (e.g., 1) via a first transmissive portion (e.g., 50R) that composes a window portion (e.g., 5) of the mobile object; a second shooting unit (e.g., 3L) configured to shoot surroundings of the mobile object via a second transmissive portion (e.g., 50L) that composes the window portion (e.g., 5) of the mobile object; a first heater (e.g., 4R) configured to be capable of heating the first transmissive portion; a second heater (e.g., 4L) configured to be capable of heating the second transmissive portion; a notification unit (e.g., 9) configured to notify a passenger of information; and a control unit (e.g., 25) configured to determine a malfunction of the first heater and the second heater, and cause the notification unit to give notification regarding an occurrence of the malfunction, wherein the control unit suppresses the notification by the notification unit when it is determined that the second heater has malfunctioned compared to when it is determined that the first heater has malfunctioned.

According to this embodiment, the frequency of notification to the passenger in the event of a heater malfunction is lowered, and thus the annoyance felt by the passenger can be further reduced.

2. In the above-described embodiment, when a malfunction has occurred in the second heater, the notification unit does not give the notification to the passenger.

According to this embodiment, as the passenger is not notified when a malfunction has occurred in the second heater, the annoyance felt by the passenger can be further reduced.

3. In the above-described embodiment, the first shooting unit and the second shooting unit are used in travel assistance control, the first shooting unit is used at least in automated driving control, and the second shooting unit is used at least in control that provides a lower degree of assistance than automated driving.

According to this embodiment, notification is suppressed when a malfunction has occurred in the second heater corresponding to the second shooting unit, which is used in control that provides a low degree of assistance. Therefore, even when a malfunction has occurred in the second heater, the travel assistance control can be continued using the first shooting unit used in control that provides a high degree of assistance, and it is thus possible to both continue the travel assistance control and reduce the annoyance felt by the passenger.

4. In the above-described embodiment, the first shooting unit and the second shooting unit are used in travel assistance control, the second shooting unit is used at least in automated driving control, and the first shooting unit is used at least in control that provides a lower degree of assistance than automated driving.

According to this embodiment, notification is suppressed when a malfunction has occurred in the second heater corresponding to the second shooting unit, which is used in control that provides a high degree of assistance. Therefore, even when a malfunction has occurred in the second heater, the travel assistance control can be continued using the first shooting unit used in control that performs white line detection and the like and provides a low degree of assistance. It is thus possible to both ensure safety and reduce the annoyance experienced by the passenger.

5. The shooting system for the mobile object according to the above-described embodiment further includes: a malfunction detection unit (e.g., 40R, 40L) configured to detect a malfunction of the first heater and the second heater; and a malfunction information storage unit (e.g., 25a) configured to store malfunction information of the first heater and the second heater when the malfunction detection unit has detected a malfunction of the first heater and the second heater.

According to this embodiment, as the malfunction information is stored in the malfunction information storage unit, the malfunction information can be obtained at a later time.

6. In the above-described embodiment, malfunction information stored in the malfunction information storage unit is detectable by an external diagnosis device (e.g., 50) that diagnoses a malfunction of a control system of the mobile object.

According to this embodiment, the external diagnosis device can detect a heater malfunction.

7. In the above-described embodiment, the first transmissive portion and the second transmissive portion are transmissive portions of a windshield (e.g., 5).

According to this embodiment, the frequency of notification regarding a malfunction of a heater corresponding to a shooting apparatus that shoots the front of the mobile object is lowered, and thus the annoyance felt by the passenger can be further reduced.

The present invention is not limited to the above-described embodiment, and various changes and modifications can be made within the scope of the essential spirit of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A shooting system for a mobile object, the shooting system comprising:
   a first shooting unit configured to shoot surroundings of a mobile object via a first transmissive portion that composes a window portion of the mobile object;
   a second shooting unit configured to shoot surroundings of the mobile object via a second transmissive portion that composes the window portion of the mobile object;
   a first heater configured to be capable of heating the first transmissive portion;
   a second heater configured to be capable of heating the second transmissive portion;
   a notification unit configured to notify a passenger of information; and
   a control unit configured to determine a malfunction of the first heater and the second heater, and cause the notification unit to give notification regarding an occurrence of the malfunction,
   wherein the control unit suppresses the notification by the notification unit when it is determined that the second heater has malfunctioned compared to when it is determined that the first heater has malfunctioned.

2. The shooting system for the mobile object according to claim 1, wherein
   when a malfunction has occurred in the second heater, the control unit does not cause the notification unit to give the notification.

3. The shooting system for the mobile object according to claim 1, wherein
   the first shooting unit and the second shooting unit are used in travel assistance control,
   the first shooting unit is used at least in automated driving control, and
   the second shooting unit is used at least in control that provides a lower degree of assistance than automated driving.

4. The shooting system for the mobile object according to claim 1, wherein
   the first shooting unit and the second shooting unit are used in travel assistance control,
   the second shooting unit is used at least in automated driving control, and
   the first shooting unit is used at least in control that provides a lower degree of assistance than automated driving.

5. The shooting system for the mobile object according to claim 1, further comprising:
   a malfunction detection unit configured to detect a malfunction of the first heater and the second heater; and
   a malfunction information storage unit configured to store malfunction information of the first heater and the second heater when the malfunction detection unit has detected a malfunction of the first heater and the second heater.

6. The shooting system for the mobile object according to claim 5, wherein
   malfunction information stored in the malfunction information storage unit is detectable by an external diagnosis device that diagnoses a malfunction of a control system of the mobile object.

7. The shooting system for the mobile object according to claim 1, wherein
   the first transmissive portion and the second transmissive portion are transmissive portions of a windshield.

* * * * *